United States Patent [19]
Hashimoto et al.

[11] Patent Number: 5,205,258
[45] Date of Patent: Apr. 27, 1993

[54] KNOCK SUPPRESSING APPARATUS AND METHOD

[75] Inventors: Atsuko Hashimoto; Toshio Iwata; Yasuhiko Hosoya; Atsushi Ueda, all of Himeji, Japan

[73] Assignee: Mitsubishi Denki Kabushiki Kaisha, Tokyo, Japan

[21] Appl. No.: 749,348

[22] Filed: Aug. 23, 1991

[30] Foreign Application Priority Data

Aug. 28, 1990 [JP] Japan .................................. 2-224478
Sep. 27, 1990 [JP] Japan .................................. 2-255136
Oct. 3, 1990 [JP] Japan .................................. 2-263875

[51] Int. Cl.$^5$ ........................ F02P 5/145; G01L 23/22
[52] U.S. Cl. ...................................... 123/425; 73/35
[58] Field of Search ...................... 123/425, 435; 73/35

[56] References Cited

U.S. PATENT DOCUMENTS

| | | | |
|---|---|---|---|
| 4,312,214 | 1/1982 | Kramer et al. | 73/35 |
| 4,425,891 | 1/1984 | Kashimura et al. | 123/425 |
| 4,463,722 | 8/1984 | Kobayashi | 123/425 |
| 4,766,545 | 8/1988 | Nagai | 364/431.08 |
| 4,887,456 | 12/1989 | Cockerham et al. | 73/35 |
| 5,109,820 | 5/1992 | Iwata et al. | 123/425 |

FOREIGN PATENT DOCUMENTS 2832594 2/1979 Fed. Rep. of Germany .
3045178 7/1981 Fed. Rep. of Germany .
3342466 6/1985 Fed. Rep. of Germany .

Primary Examiner—Andrew M. Dolinar
Attorney, Agent, or Firm—Sughrue, Mion, Zinn, Macpeak & Seas

[57] ABSTRACT

A knock suppressing apparatus for an internal combustion engine includes an amplifier that amplifies the output signal of a knock sensor for sensing engine vibrations. A vibration level signal and a threshold signal are generated based on the amplifier output signals, and knocking is detected by comparing the vibration level signal and the threshold signal. The gain of the amplifier is varied in accordance with an operating condition indicative of the noise level of the engine so as to maintain the vibration level signal and the threshold signal within prescribed ranges suitable for knock determination. In one form of the invention, when the amplifier gain is varied, the threshold signal is also varied at substantially the same time and by substantially the same percentage as the amplifier gain.

13 Claims, 9 Drawing Sheets

KNOCK SUPPRESSING APPARATUS AND METHOD

BACKGROUND OF THE INVENTION

This invention relates to an apparatus and method for suppressing knocking in an internal combustion engine such as an automotive engine.

In an internal combustion engine, if the ignition timing is too far advanced, abnormal vibrations referred to as knocking may occur. Since knocking can damage the cylinders of an engine, many engines are equipped with a knock suppressing apparatus that senses the occurrence of knocking and then controls an engine operating parameter (such as the ignition timing) so as to suppress the knocking.

A typical knock suppressing apparatus is equipped with a knock sensor that is mounted on an engine. The knock sensor detects vibrations of the engine, including vibrations due to knocking, and generates a corresponding output signal. The output signal is amplified and processed to produce a vibration level signal indicative of the magnitude of the engine vibrations during prescribed periods of time when knocking is most likely to occur. The vibration level signal is compared with a threshold signal that is chosen so as to be higher than the background noise level of the vibration signal. When the vibration level signal exceeds the threshold signal, the knock suppressing apparatus determines that knocking is taking place and retards the ignition timing until knocking no longer occurs.

The vibration level signal and the threshold signal generally increase in magnitude as the engine rotational speed increases. Therefore, if the engine rotational speed varies over a wide range, the dynamic ranges of the vibration level signal and the threshold signal become very large, and the large dynamic ranges of these signals make it difficult to accurately detect knocking over the entire operating range of the engine.

SUMMARY OF THE INVENTION

Accordingly, it is an object of the present invention to provide a knock suppressing apparatus and method which can accurately sense knocking over the entire speed range of an internal combustion engine.

A knock suppressing apparatus according to the present invention includes an amplifier that amplifies the output signal of a knock sensor for sensing engine vibrations. A vibration level signal and a threshold signal are generated based on the amplifier output signal. The levels of the vibration level signal and the threshold signal are limited to a suitable range by varying the gain of the amplifier in accordance with an operating condition indicative of the noise level of the engine. As the noise level increases, the amplifier gain is decreased and vice versa. As a result of varying the gain, the dynamic ranges of the vibration level signal and the threshold level signal are limited to levels suitable for accurate knock sensing.

The amplification gain can be varied on the basis of various operating conditions. In one form of the present invention, the operating condition is the threshold signal. In another form of the present invention, the operating condition is the engine rotational speed. In yet another form of the present invention, the operating condition is both the threshold signal and the engine rotational speed.

In preferred embodiments, the gain is switched in a step-wise manner among at least two different gain levels.

DESCRIPTION OF THE PREFERRED EMBODIMENTS

Figure 1:
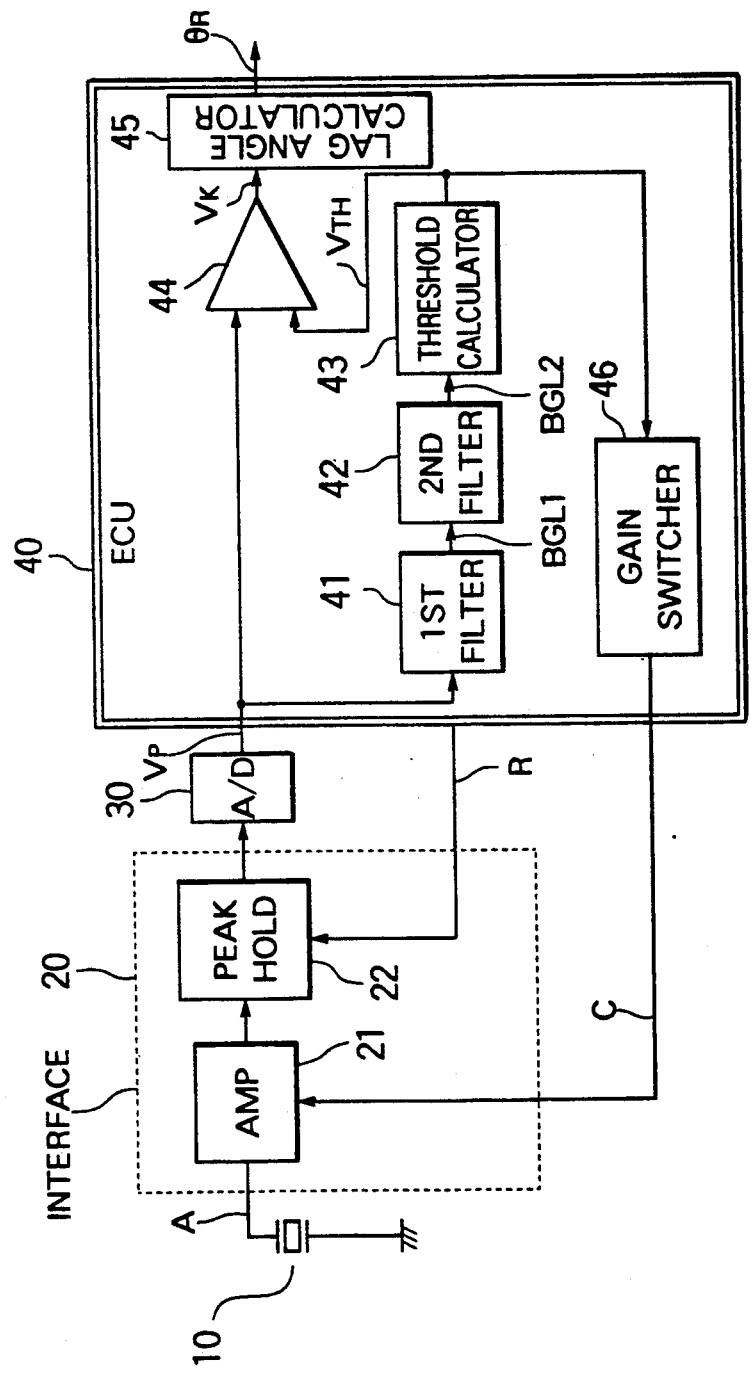
FIG. 1 is a block diagram of a first embodiment of the present invention.

A number of preferred embodiments of a knock suppressing apparatus according to the present invention will now be described while referring to the accompanying drawings. FIG. 1 is a block diagram of a first embodiment. As shown in FIG. 1, a conventional knock sensor 10 having a filtering capability is mounted on an unillustrated, multicylinder internal combustion engine in a location having good sensitivity to engine knocking. A separate knock sensor 10 can be provided for each cylinder of the engine, or a plurality of the cylinders may share a single knock sensor. For example, if the engine is divided into banks of cylinders, a separate knock sensor may be mounted on each bank. The knock sensor 10 generates an output signal A, which typically has a wave form like that illustrated in FIG. 2. The output signal A includes components due to engine knocking as well as components due to other mechanical vibrations of the engine. The fuel in an internal combustion engine usually combusts in the range of 10–60 degrees after top dead center (ATDC), so if knocking occurs, it will occur in this period, and the knock sensor output signal A will have its largest value during this period.

Figure 2:
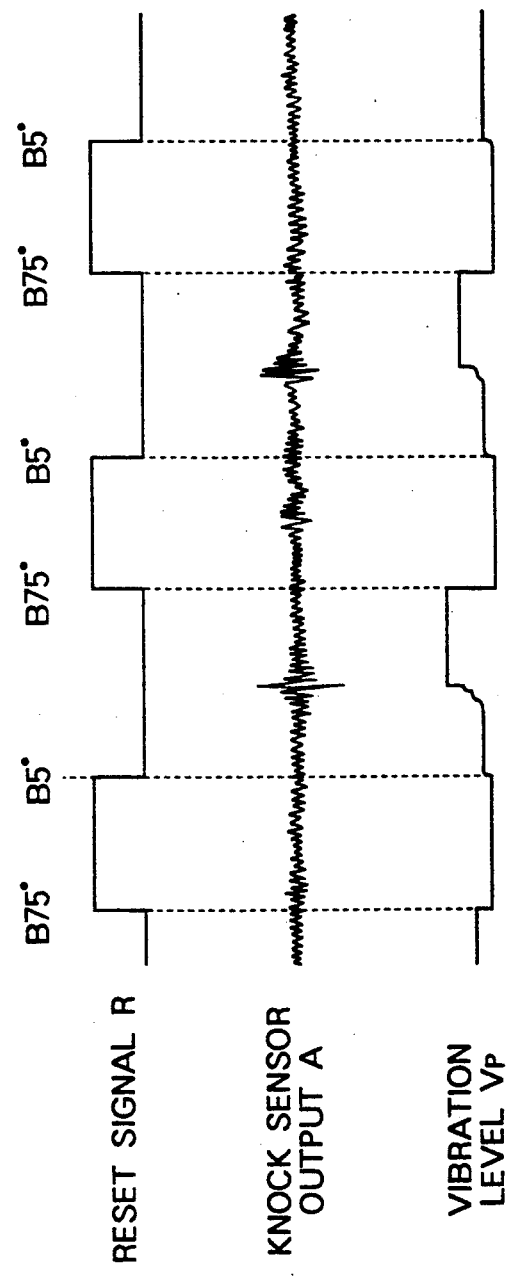
FIG. 2 is a wave form diagram of various signals generated during the operation of the embodiment of FIG. 1.

The output signal A is input to an interface 20 including a variable gain amplifier 21 and a peak hold circuit 22. The amplifier 21 amplifies the output signal A, and the peak hold circuit 22 holds the peak value of the amplified signal occurring during a prescribed period of engine rotation. The gain G of the amplifier 21 is switched between a first gain G1 and a second gain G2 (G1>G2) by a gain switching signal C input to the amplifier 21 from an electronic control unit (ECU) 40. The peak hold circuit 22 is periodically reset by a reset signal R from the ECU 40 so that the peak hold circuit 22 operates only during periods when engine knocking can take place. FIG. 2 shows an example of the wave form of the reset signal R. In the present embodiment, the peak hold circuit 22 begins holding the peak value of the amplifier output signal when the reset signal R changes from a high level to a low level, and the peak hold circuit 22 is reset when the reset signal R changes from a low level to a high level. The peak hold circuit 22 does not operate as long as the reset signal R has a high level. The reset signal R changes levels at crankshaft angles corresponding to prescribed piston positions, such as each time one of the pistons of the engines is at 75 degrees or 5 degrees before top dead center (BTDC).

It is possible to use an integrator in the interface 20 instead of a peak hold circuit to generate a signal indicative of the level of engine vibrations.

The output signal of the peak hold circuit 22 is converted to a digital signal by an A/D converter 30. This signal, which will be referred to as the vibration level signal $V_p$, indicates the level of knocking occurring in a cylinder during a prescribed period. The vibration level signal $V_p$ is sampled by the ECU 40 at prescribed intervals, such as every time one of the pistons of the engine is at 75 degrees BTDC. FIG. 2 illustrates an example of the vibration level signal $V_p$. It varies each sampling period in accordance with changes in the level of the output signal A of the knock sensor 10.

The ECU 40 includes a first digital filter 41 that smooths the vibration level signal $V_p$ and generates a first average BGL1, a second digital filter 42 that smooths the first average BGL1 and generates a second average BGL2, and a threshold calculator 43 that calculates a threshold signal $V_{TH}$ for knock determination based on the second average BGL2. The threshold signal $V_{TH}$ and the vibration level signal $V_p$ are input to a comparator 44 that generates a knock determination signal Vk when the vibration level signal $V_p$ exceeds the threshold signal $V_{TH}$. The knock determination signal Vk is input to a lag angle calculator 45 that calculates a lag angle $\Theta_R$ for retarding the ignition timing of the cylinder corresponding to the current vibration level signal $V_p$. The lag angle $\Theta_R$ is provided to an unillustrated control unit for controlling the ignition timing of the engine. The threshold signal $V_{TH}$ is also input to a gain switching controller 46, which on the basis of the threshold signal $V_{TH}$ generates the gain switching signal C.

The precise algorithms used by the first digital filter 41, the second digital filter 42, and the threshold calculator 43 are not critical. Preferably, the algorithms are chosen such that the threshold signal $V_{TH}$ has a stable value somewhat higher than the vibration level signal $V_p$ in the absence of knocking so that the vibration level signal $V_p$ will exceed the threshold signal $V_{TH}$ only when knocking is actually occurring. In the present embodiment, the first digital filter 41 calculates the first average BGL1 at prescribed intervals using the following formula:

$$BGL1 = BGL1^* \times (N_1-1)/N_1 + V_p/N_1 \ldots \quad (1)$$

wherein $N_1$ is a predetermined constant, $V_p$ is the present value of the vibration level signal at the most recent sampling, and BGL1* is the previous value of the first average BGL1 calculated at the time of the previous sampling of the vibration level signal $V_p$. Thus, each time the first average BGL1 is calculated, it is shifted from its previous value BGL1* by an amount proportional to the present vibration level signal $V_p$. The smaller is $N_1$, the faster the first average responds to changes in the vibration level signal $V_p$. In the present embodiment, the first average BGL1 is updated each time the vibration level signal $V_{TH}$ is sampled by the ECU 40, which is each time the peak hold circuit 26 is reset.

Each time the first average BGL1 is calculated, the second digital filter 42 calculates the second average by the following formula:

$$BGL2 = BGL2^* \times (N_2-1)/N_2 + BGL1/N_2 \ldots \quad (2)$$

wherein $N_2$ is a predetermined constant and BGL2* is the previous value of the second average BGL2. Thus, each time the second average BGL2 is calculated, it is shifted from its previous value BGL2* by a value proportional to the current value of the first average BGL1. The second average BGL2 is a stable value that is not excessively affected by fluctuations of the vibration level signal $V_p$. The values of constants $N_1$ and $N_2$ can be chosen in accordance with the desired responsiveness of the first and second averages BGL1 and BGL2 to changes in the vibration level signal $V_p$. It is possible to increase $N_1$ when knocking is sensed so that the first average BGL1 will be less affected by increases in the vibration level $V_p$ due to knocking.

Each time the second average BGL2 is calculated, the threshold calculator 43 calculates the threshold signal $V_{TH}$ by the following formula:

$$V_{TH} = (K \times BGL2) + V_{OF} \ldots \quad (3)$$

wherein K is a predetermined constant and $V_{OF}$ is a predetermined offset voltage. Since the first and second digital filters 41 and 42 adequately smooth the vibration level signal $V_p$, the threshold signal $V_{TH}$ has a stable value largely unaffected by fluctuations in the vibration level signal $V_p$.

The knock determination signal Vk which is output by the comparator 44 can be one which has a first level (such as a high level) when the vibration level signal $V_p$ exceeds the threshold signal $V_{TH}$ and a second level (such as a low level) when the vibration level signal $V_p$ is less than or equal to the threshold signal $V_{TH}$. In the present embodiment, however, in order to enable more precise control of the lag angle, the knock determination signal Vk has a value proportional to the difference between the vibration level signal $V_p$ and the threshold signal $V_{TH}$ when the vibration level signal $V_p$ exceeds the threshold signal $V_{TH}$ and has a value of 0 or is not generated when the vibration level signal $V_p$ is less than or equal to the threshold signal $V_{TH}$. For example, the knock determination signal Vk can be equal to $V_p - V_{TH}$.

When the knock determination signal Vk has a value indicating the occurrence of knocking, the lag angle calculator 45 calculates a control angle $\Delta\Theta_R$ by the following formula:

$$\Delta\Theta_R = (Vk/V_{TH}) \times L \ldots \quad (4)$$

wherein L is a predetermined constant. The lag angle calculator 45 then calculates the lag angle $\Theta_R$ by the following formula:

$$\Theta_R = \Theta_R^* + \Delta\Theta_R \ldots \quad (5)$$

wherein $\Theta_R^*$ is the previous value of the lag angle.

On the other hand, when the knock determination signal Vk is 0 or is not generated, the control angle $\Delta\Theta_R$ becomes 0, so the lag angle $\Theta_R$ maintains its previous value.

Thus, whenever the vibration level signal $V_p$ exceeds the threshold signal $V_{TH}$ due to the occurrence of knocking, the lag angle $\Theta_R$ is increased until knocking is no longer detected.

Figure 3:
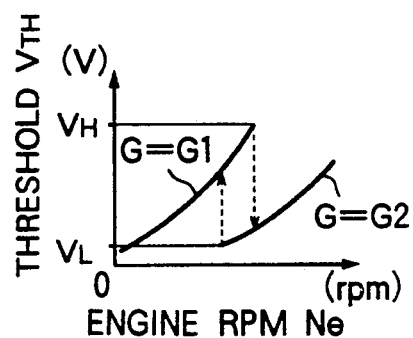
FIG. 3 is a graph showing the threshold signal as a function of engine rotational speed during the operation of the embodiment of FIG. 1.

As the engine rotational speed changes, both the vibration level signal $V_p$ and the threshold signal $V_{TH}$ vary. It is desirable to maintain the threshold signal $V_{TH}$ within a prescribed range which is optimal for knock determination. This range has a predetermined upper limit $V_H$ and lower limit $V_L$, which are previously stored in an unillustrated memory contained in a suitable portion of the ECU 40, such as the gain switching controller 46. The gain switching controller 46 switches the gain of the amplifier 21 so as to maintain the threshold signal $V_{TH}$ within the prescribed range. As shown in FIG. 3, which is a graph of the threshold signal $V_{TH}$ as a function of the engine rotational speed Ne, the gain G of the amplifier 21 is initially set to the first gain G1. As the engine rotational speed Ne increases, the threshold signal $V_{TH}$ likewise increases as shown by the upper curve in FIG. 3. When the threshold signal $V_{TH}$ reaches the upper limit $V_H$, the gain switching controller 46 generates a gain switching signal C which switches the gain G of the amplifier 21 from the first gain G1 to the second gain G2, which is lower than the first gain G1. The lowering of the gain G from the first gain G1 to the second gain G2 causes the threshold signal $V_{TH}$ to fall to a point along the lower curve in FIG. 3 corresponding to the second gain G2, so even if the rotational speed continues to increase, the threshold signal $V_{TH}$ stays within the prescribed range between the upper and lower limits $V_H$ and $V_L$.

On the other hand, if the engine rotational speed now starts to decrease, the threshold signal $V_{TH}$ falls along the lower curve in FIG. 3. When the threshold signal $V_{TH}$ reaches the lower limit $V_L$, the gain switching controller 46 generates a gain switching signal C which switches the gain from the second gain G2 to the higher first gain G1. As a result, the threshold signal $V_{TH}$ increases to a point along the upper curve in FIG. 3, so even if the engine rotational speed continues to decrease, the threshold signal $V_{TH}$ will remain within the prescribed range between the upper and lower limits $V_H$ and $V_L$.

Since the vibration level signal $V_p$ is dependent on the gain G of the amplifier 27, the switching of the gain G between the first and second gains G1 and G2 also keeps the vibration level signal $V_p$ within a suitable range. As a result, regardless of the engine rotational speed, the vibration level signal $V_p$ and the threshold signal $V_{TH}$ can be maintained within optimal ranges for knock determination, so the comparator 44 does not need to have a large dynamic range, and knock sensing can be performed with good precision.

The upper and lower limits $V_H$ and $V_L$ are preferably chosen so that the rotational speed at which the gain G switches from the first gain G1 to the second gain G2 is different from the rotational speed at which the gain switches from the second gain G2 to the first gain G1. Thus, gain switching is performed with hysteresis. This hysteresis prevents undesirable hunting from taking place.

An example of a method of suppressing knocking using the embodiment of FIG. 1 will now be described. The vibrations of the engine are sensed by the knock sensor 10, which generates a corresponding output signal A. The signal A is amplified by the amplifier 21 having a gain G and then is processed by the peak hold circuit 22 and the A/D converter 30 to generate a vibration level signal $V_p$. The vibration level signal $V_p$ is processed by the first digital filter 41, the second digital filter 42, and the threshold calculator 43 to generate a threshold signal $V_{TH}$. The vibration level signal $V_p$ is compared with the threshold signal $V_{TH}$, and when the vibration level signal $V_p$ exceeds the threshold signal $V_{TH}$, it is determined that knocking is taking place and the ignition timing is retarded so as to suppress the knocking.

When the threshold signal $V_{TH}$ rises to the upper limit $V_H$, the gain of the amplifier 21 is switched from the first gain G1 to the lower second gain G2. When the threshold signal $V_{TH}$ falls to the lower limit $V_L$, the gain is switched from the second gain G2 to the first gain G1. When the threshold signal $V_{TH}$ is between the upper and lower limits $V_H$ and $V_L$, the gain maintains its current value.

Figure 4:
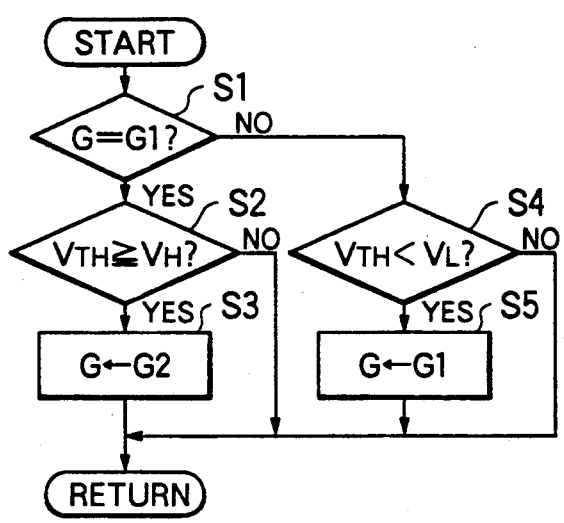
FIG. 4 is a flow chart of the operation of the embodiment of FIG. 1.

FIG. 4 illustrates a routine that can be performed by the ECU 40 of FIG. 1 to switch the amplifier gain to the appropriate level. First, in Step S1, it is determined whether the amplifier gain G is the first gain G1. If it is the first gain G1, then in Step S2, it is determined whether the threshold signal $V_{TH}$ is at least the upper limit $V_H$. If the threshold signal $V_{TH}$ is at least the upper limit $V_H$, then in Step S3, the amplifier gain G is switched to the second gain G2, and a return is performed. On the other hand, if the threshold signal $V_{TH}$ is smaller than the upper limit $V_H$, then a return is performed from Step S2 without altering the gain G.

If in Step S1 it is determined that the amplifier gain G is not the first gain G1, then the gain G must be the second gain G2, so in Step S4, it is determined whether the threshold signal $V_{TH}$ is smaller than the lower limit $V_L$. If it is smaller than the lower limit $V_L$, then in Step S5 the gain G is switched to the first gain G1 and a return is performed. On the other hand, if in Step S4 the threshold signal $V_{TH}$ is at least the lower limit $V_L$, a return is performed directly from Step S4 without changing the gain G.

The routine of FIG. 4 is repeated by the ECU 40 at predetermined intervals, such as each time the peak hold circuit 22 is reset.

Instead of the gain being switched between only two levels G1 and G2, it is possible to switch the gain among three or more levels. For example, after the gain is switched from the first gain G1 to the second gain G2, if the threshold signal thereafter increases to the upper limit $V_H$, the gain can be switched from the second gain G2 to a third gain G3 that is smaller than the second gain G2. Upon the threshold signal falling to the lower limit $V_L$, the gain would be switched from the third gain G3 to the second gain G2, and when the threshold signal again fell to the lower limit $V_L$, the gain would be switched form the second gain G2 to the first gain G1.

Figure 5:
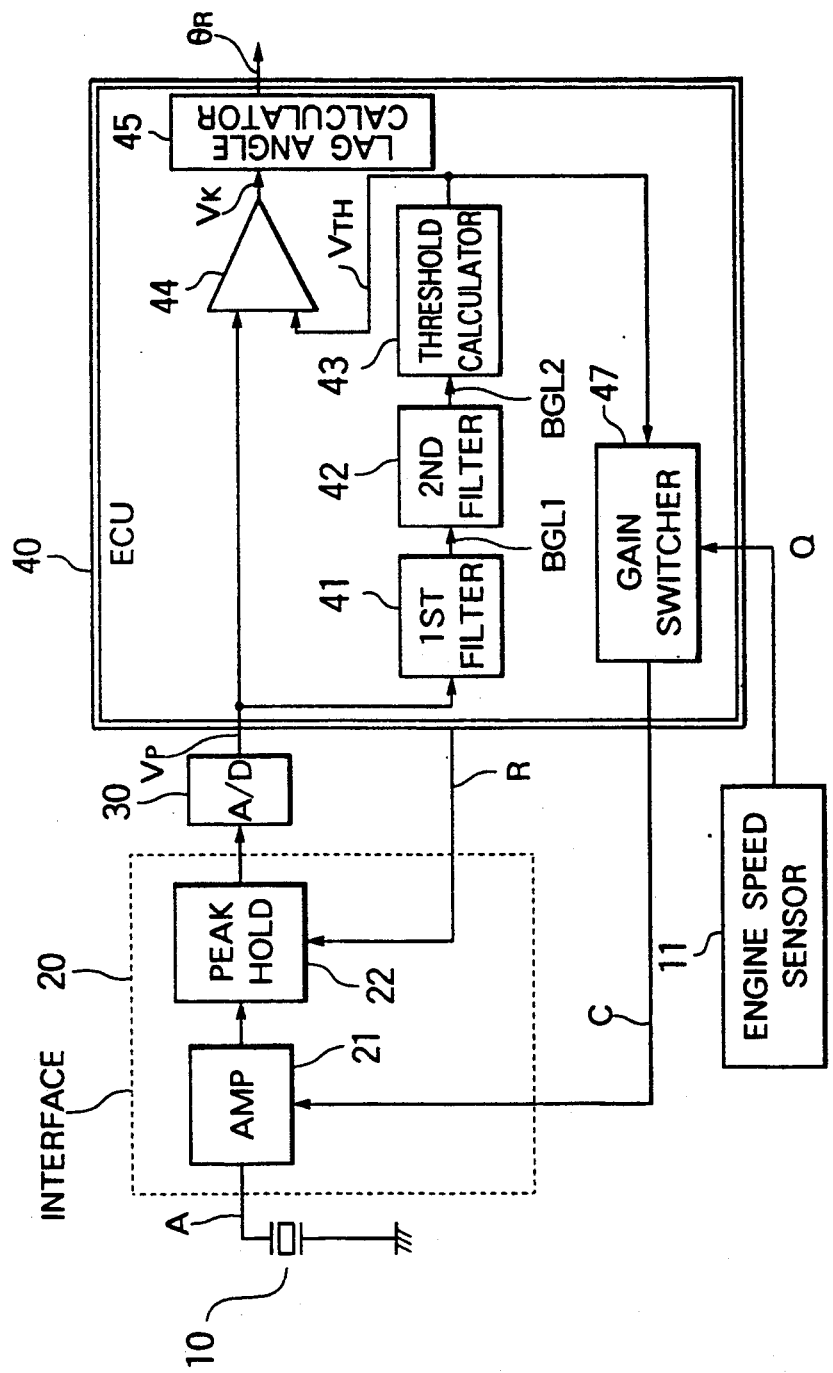
FIG. 5 is a block diagram of a second embodiment of the present invention.

In the embodiment of FIG. 1, the gain of the amplifier 21 is switched solely on the basis of the threshold signal $V_{TH}$. FIG. 5 illustrates a second embodiment of the present invention in which the amplifier gain is switched on the basis of both the threshold signal $V_{TH}$ and the engine rotational speed Ne. The structure of this embodiment is similar to that of the embodiment of FIG. 1 with the exception that the gain switching controller 46 of FIG. 1 has been replaced by a gain switching controller 47 that generates a gain switching signal C on the basis of the threshold signal $V_{TH}$ from the threshold calculator 43 and an input signal Q indicating an operating condition of the engine. In this embodiment, the input signal Q is indicative of the engine rotational speed Ne and is generated by an engine rotational speed sensor 11 of the type with which engines are commonly equipped.

Figure 6:
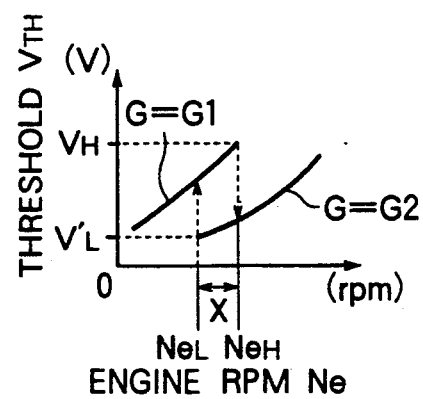
FIG. 6 is a graph showing the threshold signal as a function of engine rotational speed during the operation of the embodiment of FIG. 5.

FIG. 6 illustrates the threshold signal $V_{TH}$ as a function of the engine rotational speed during the operation of the embodiment of FIG. 5. As in the embodiment of FIG. 1, the gain G of the amplifier 21 is initially set to the first gain G1. As the engine rotational speed increases, the threshold signal $V_{TH}$ likewise increases along the upper curve marked G1 in FIG. 6. When the threshold signal $V_{TH}$ reaches a predetermined upper limit $V_H$ which is stored in a memory of the ECU 40, the gain switching controller 47 stores the current engine rotational speed in a memory. The current engine rotational speed when the threshold signal $V_{TH}$ equals the upper limit $V_H$ will be referred to as an upper switching speed $Ne_H$. At the same time, the gain switching controller 47 generates a gain switching signal C which switches the gain G of the amplifier 21 from the first gain G1 to the second gain G2, which is lower than the first gain G1. The lowering of the gain G from the first gain G1 to the second gain G2 causes the threshold signal $V_{TH}$ to fall to a point along the lower curve in FIG. 6 corresponding to the second gain G2, so even if the rotational speed continues to increase beyond the upper switching speed $Ne_H$, the threshold signal $V_{TH}$ does not exceed the upper limit $V_H$.

Based on the upper switching speed $Ne_H$, the gain switching controller 47 calculates a lower switching speed $Ne_L$, which is defined by the formula $$Ne_L = Ne_H - X \ldots \quad (6)$$

wherein X is a predetermined constant stored in a memory of the ECU 40. After the lower switching speed $Ne_L$ is calculated, it is stored in a memory of the ECU 40. The threshold signal $V_{TH}$ corresponding to the lower switching speed $Ne_L$ will be designated as $V_L'$. When the gain switching controller 47 determines that the engine rotational speed has fallen to the lower switching speed $Ne_L$, the gain switching controller 47 generates a gain switching signal C which switches the amplifier gain from the second gain G2 to the higher first gain G1. As a result, the threshold signal $V_{TH}$ increases to a point along the upper curve in FIG. 6, so even if the engine rotational speed continues to decrease below the lower switching speed $Ne_L$, the threshold signal $V_{TH}$ will remain within a suitable range for knock determination.

Once the gain switching controller 47 has determined the upper switching speed $Ne_H$ and the lower switching speed $Ne_L$, the amplifier gain G can be switched on the basis of the engine rotational speed Ne rather than on the threshold signal $V_{TH}$. Namely, after the switching speeds $Ne_H$ and $Ne_L$ have been once established, the gain switching controller 47 can switch the gain from the first gain G1 to the second gain G2 whenever it determines that the engine rotational speed Ne is greater than or equal to the upper switching speed $Ne_H$ and can switch the gain from the second gain G2 to the first gain G1 whenever it determines that the engine rotational speed is less than or equal to the lower switching speed $Ne_L$.

The threshold signal $V_{TH}$ is influenced by factors besides the engine rotational speed Ne, and it is less stable than the engine rotational speed. If gain switching is performed solely on the basis of the threshold signal $V_{TH}$, the upper and lower limits $V_H$ and $V_L$ must be set fairly far apart to provide enough hysteresis to prevent hunting. In the embodiment of FIG. 5, since gain switching is performed on the basis of the engine rotational speed, the difference between the upper limit $V_H$ corresponding to the upper switching speed $Ne_H$ and the threshold signal $V_L'$ corresponding to the lower switching speed $Ne_L$ can be smaller than the difference between $V_H$ and $V_L$, so the dynamic range threshold signal $V_{TH}$ can be reduced, which is advantageous.

Figure 7:
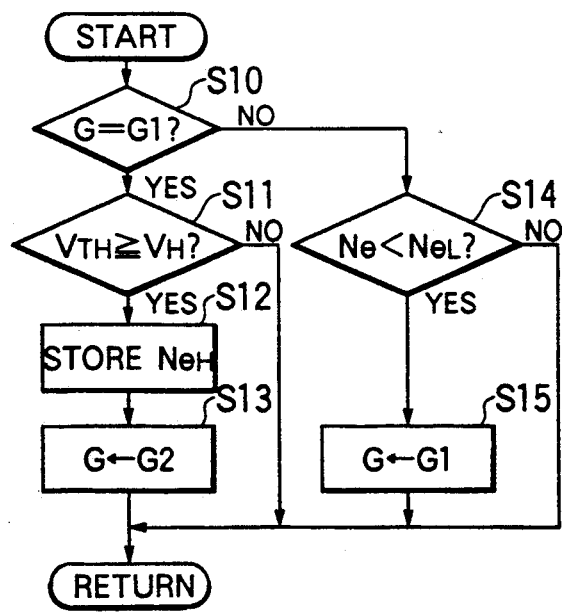
FIG. 7 is a flow chart of the operation of the embodiment of FIG. 5.

FIG. 7 is a flow chart of a routine that can be performed by the ECU 40 of the embodiment of FIG. 5 to switch the amplifier gain G. First, in Step S10, it is determined whether the amplifier gain G is the first gain G1. If it is the first gain G1, then in Step S11, it is determined whether the threshold signal $V_{TH}$ is at least the upper limit $V_H$, then in Step S12, the current rotational speed $Ne_H$ corresponding to the upper limit $V_H$ is stored in a memory, and in Step S13, the amplifier gain G is switched to the second gain G2, after which a return is performed. On the other hand, if in Step S11 the threshold signal $V_{TH}$ is smaller than the upper limit $V_H$, a return is performed from Step S11 without altering the gain G.

If in Step S10 it is determined that the amplifier gain G is not the first gain G1, then the gain G must be the second gain G2, so in Step S14, it is determined whether the engine rotational speed Ne is less than the calculated lower switching speed $Ne_L$. If it is less than the lower switching speed $Ne_L$, then in Step S15 the gain is switched to the first gain G1 and a return is performed. On the other hand, if in Step S14 the engine rotational speed Ne is at least the lower switching speed $Ne_L$, a return is performed directly from Step S14.

The routine of FIG. 7 is repeated at predetermined intervals, such as each time of the peak hold circuit 22 is reset.

Except for the manner of switching the amplifier gain, the operation of the embodiment of FIG. 5 is the same as the embodiment of FIG. 1. Based on the threshold signal $V_{TH}$ and the vibration level signal $V_p$, the comparator 44 generates a knock determination signal Vk, and the lag angle calculator 45 generates a lag angle $\Theta_R$ that retards the engine ignition timing so as to suppress knocking.

In the embodiments of FIGS. 1 and 5, due to the smoothing performed by the first and second digital filters 41 and 42, the threshold signal $V_{TH}$ changes more slowly than does the vibration level signal $V_p$. When the amplifier gain G is switched between the first and second gains G1 and G2, the vibration level signal $V_p$ undergoes a sudden change in value, but the threshold signal $V_{TH}$ undergoes only gradually, so immediately after a change in the amplifier gain G, the threshold signal $V_{TH}$ is either higher than it should be (when the gain G falls from G1 to G2) or lower than it should be (when the gain G rises from G2 to G1) to accurately sense knocking. Until the threshold signal $V_{TH}$ reaches a new value corresponding to the new gain, it is not possible to accurately sense knocking. If the threshold signal $V_{TH}$ is too high immediately after a change in the gain, then the comparator 44 will not generate a knock determination signal Vk even if knocking is occurring, and if the threshold signal $V_{TH}$ is too low, the comparator 44 may erroneously generate a knock determination signal Vk in the absence of knocking.

Figure 8:
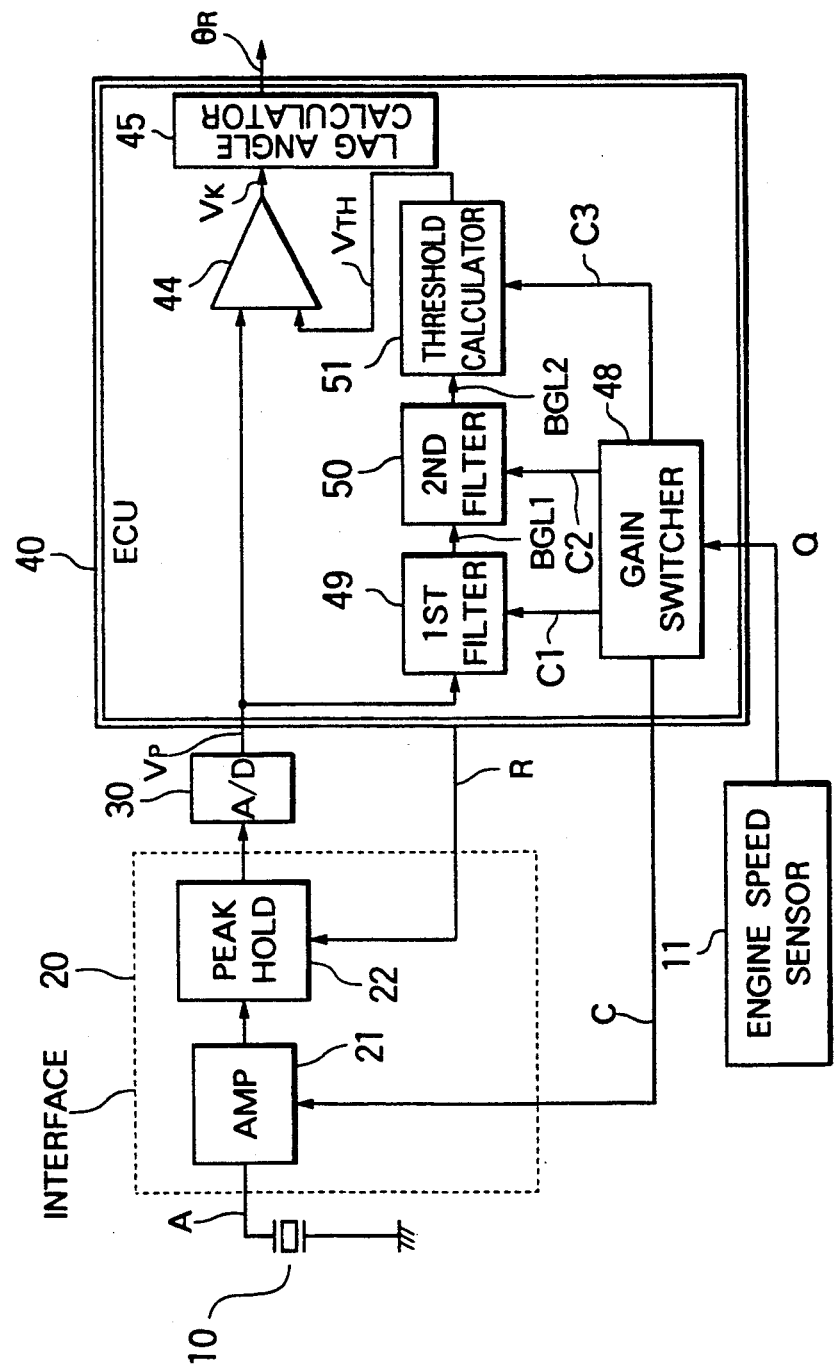
FIG. 8 is a block diagram of a third embodiment of the present invention.

This problem is solved by a third embodiment of the present invention illustrated in FIG. 8. The overall structure of this embodiment is similar to that of the preceding two embodiments, but it differs with respect to the structure of the ECU 40.

The ECU 40 includes a gain switching controller 48 that generates a gain switching signal C based on an input signal Q from an engine speed sensor 11 indicating the engine rotational speed Ne. The gain switching signal C switches the gain of the amplifier 21 between a first gain G1 and a second gain G2 smaller than the first gain G1 according to the engine rotational speed Ne.

Namely, the gain switching signal C sets the gain G of the amplifier 21 to the first gain G1 when the engine rotational speed Ne is in a first range having a prescribed rotational speed $Ne_a$ as an upper limit, and it sets the gain G to the second gain G2 when the engine rotational speed Ne is in a second range having the prescribed rotational speed $Ne_a$ as a lower limit. In other words, when the engine rotational speed Ne is less than the prescribed rotational speed $Ne_a$, the gain G is set to the first gain G1, and when the engine rotational speed Ne is at least the prescribed rotational speed $Ne_a$, the gain G is set to the second gain G2. The prescribed rotational speed $Ne_a$ is preferably no greater than the upper switching speed NeH of the embodiment of FIG. 5 so that the threshold signal $V_{TH}$ will not exceed the upper limit $V_H$.

Whenever the gain switching controller 48 generates a gain switching signal C in order to switch the amplifier gain G, it also generates data switching signals C1–C3. These signals C1–C3 are respectively provided to a first digital filter 49, a second digital filter 50, and a threshold calculator 51. The first digital filter 49 smooths the vibration level signal $V_p$ and generates a first average BGL1, the second digital filter 50 smooths the first average BGL1 and generates a second average BGL2, and the threshold calculator 51 calculates a threshold signal $V_{TH}$ based on the second average BGL2.

When the gain switching signal C is not generated, the data switching signals C1–C3 are not generated, either. In a state in which these signals are not generated, the first digital filter 49 calculates the first average BGL1 according to Equation (1), the second digital filter 50 calculates the second average BGL2 according to Equation (2), and the threshold calculator 51 calculates the threshold signal $V_{TH}$ according to Equation (3). However, when the gain switching controller 48 generates the gain switching signal C to switch the amplifier gain G, the data switching signals C1–C3 are generated, and at this time the first digital filter 49, the second digital filter 50, and the threshold calculator 51 calculate the first average BGL1, the second average BGL2, and the threshold signal $V_{TH}$ by algorithms different from those expressed by Equations (1)–(3) so as to produce a rapid change in BGL1, BGL2, and $V_{TH}$.

Namely, when the engine rotational speed Ne becomes greater than or equal to the prescribed rotational speed $Ne_a$ and the gain switching signal C is generated to switch the amplifier gain G from the first gain G1 to the second gain G2, the data switching signals C1–C3 are generated to cause the first average BGL1, the second average BGL2, and the threshold signal $V_{TH}$ to be calculated by the following algorithms:

$$BLG1 = BGL1^*/a \ldots \quad (7)$$

$$BLG2 = BGL2^*/a \ldots \quad (8)$$

$$V_{TH} = V_{TH}^*/a \ldots \quad (9)$$

wherein BGL1*, BGL2*, and $V_{TH}^*$ are the old values of BGL1, BGL2, and $V_{TH}$, and $a = G1/G2$. As a result, BGL1, BGL2, and $V_{TH}$ are changed substantially simultaneously with and by the same percentage as the gain G and the vibration level signal $V_p$ are changed. Therefore, the threshold signal $V_{TH}$ does not lag behind changes in the vibration level signal $V_p$, and erroneous knock sensing is prevented.

On the other hand, when the engine rotational speed Ne falls below the prescribed rotational speed $Ne_a$ and the gain switching signal C is generated to switch the amplifier gain G from the second gain G2 to the first gain G1, then the data switching signals C1–C3 are generated to cause the first average BGL1, the second average BGL2, and the threshold signal $V_{TH}$ to be calculated by the following algorithms:

$$BLG1 = BGL1^* \times a \ldots \quad (10)$$

$$BLG2 = BGL2^* \times a \ldots \quad (11)$$

$$V_{TH} = V_{TH} \times a \ldots \quad (12)$$

As a result, BGL1, BGL2, and $V_{TH}$ are changed substantially simultaneously with and by the same percentage as the gain G and the vibration level signal $V_p$ are changed. Therefore, the threshold signal $V_{TH}$ does not lag behind changes in the vibration level signal $V_p$, and erroneous knock sensing is prevented, just as in the case when the engine rotational speed is increasing.

Each time a change in the amplifier gain takes place, the calculations given by Equations (7)–(9) or (10)–(12) are performed a single time, after which BGL1, BGL2, and $V_{TH}$ are calculated using Equations (1)–(3), respectively, until another change in the amplifier gain takes place.

Figure 9:
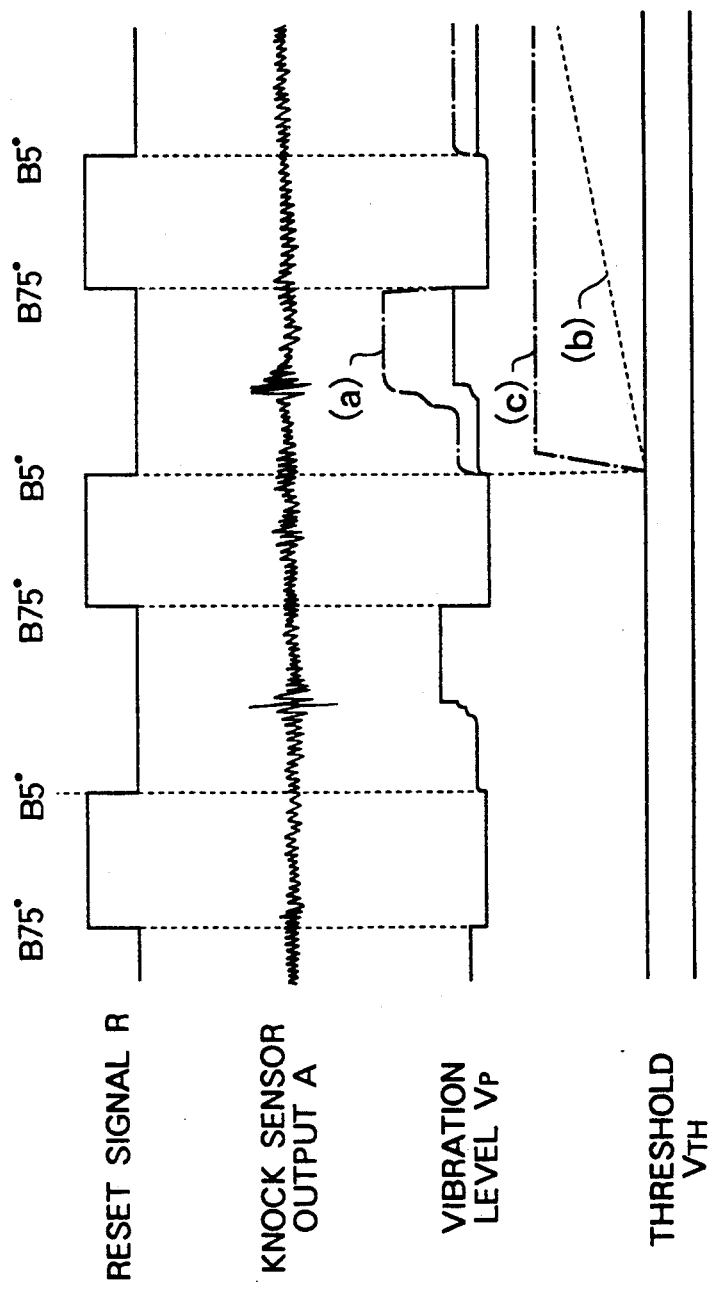
FIG. 9 is a wave form diagram of various signals generated during the operation of the embodiment of FIG. 8.

FIG. 9 illustrates the wave forms of the vibration level signal $V_p$ and the threshold signal $V_{TH}$ during the operation of the embodiment of FIG. 8. It will be assumed that the $a = 3$, that the amplifier gain is presently the second gain G2, and that the engine rotational speed Ne is falling. Furthermore, it will be assumed that at a point in time prior to the occurrence of the vibration level signal $V_p$, indicated by curve (a), the engine rotational speed Ne falls below the prescribed rotational speed $Ne_a$. When Ne becomes less than $Ne_a$, the gain switching controller 48 generates a gain switching signal C that switches the gain G from the second gain G2 to the first gain G1, so the vibration level signal $V_p$ rises from the value shown by the solid curve to the value indicated by curve (a). In the absence of the data switching signals C1–C3, the threshold signal $V_{TH}$ would increase only gradually as shown by curve (b), much more slowly than the vibration level signal $V_p$, and there would be a period of time in which the threshold signal $V_{TH}$ would be too low for the comparator 44 to accurately generate a knock determination signal Vk. However, in the present embodiment, when the gain switching signal C is generated to switch the amplifier gain G from the second gain G2 to the first gain G1, the data switching signals C1–C3 are generated, and the threshold signal $V_{TH}$ rapidly increases substantially simultaneously with a change in the gain G as shown by curve (c) to a value that enables the comparator 44 to accurately detect knocking, so there is no transient period in which knocking can not be accurately detected.

As in the previous embodiments, the vibration level signal $V_p$ and the threshold signal $V_{TH}$ are input to the comparator 44 which generates a knock determination signal Vk. The knock determination signal Vk is input to the lag angle calculator 45, which calculates a lag angle $\Theta_R$ in the same manner as in the preceding embodiments.

Figure 10:
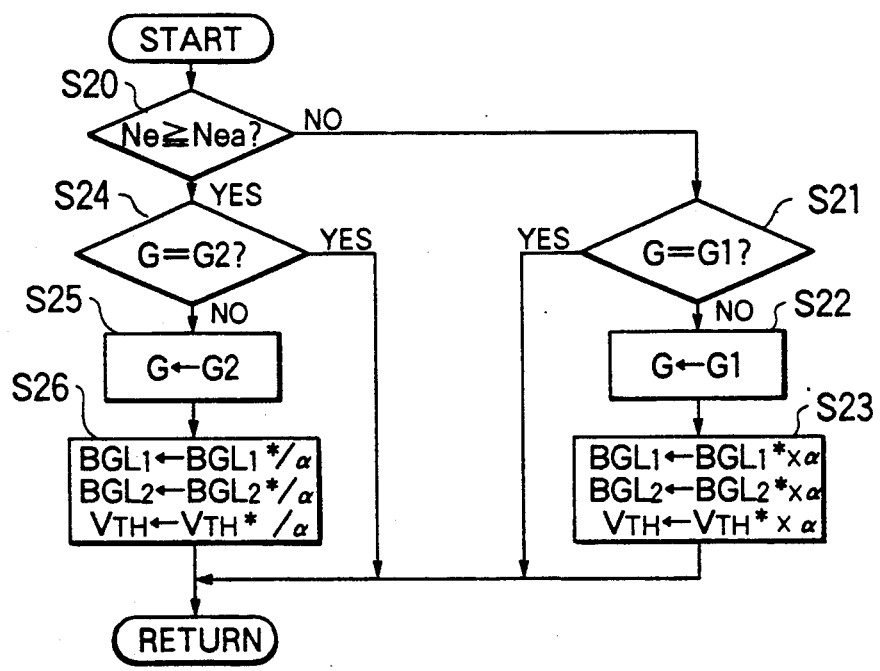
FIG. 10 is a flow chart of the operation of the embodiment of FIG. 8.

FIG. 10 is a flow chart of a routine that can be performed by the embodiment of FIG. 8 to switch the amplifier gain. First in Step S20, it is determined whether the engine rotational speed Ne is at least the prescribed rotational speed $Ne_a$. If it is not, then in Step S21, it is determined whether the amplifier gain G is the first gain G1. If it is not the first gain G1, then in Step S22, the gain G is switched to the first gain G1. In Step S23, the gain switching controller 48 generates data switching signals C1–C3 that cause the first digital filter 49, the second digital filter 50, and the threshold calculator 51 to calculate the values of BGL1, BGL2, and $V_{TH}$ according to Equations (10)–(12). A return is then performed. If in Step S21 the gain G is already equal to the first gain G1, then a return is performed without changing the value of the gain G.

If in Step S20, it is determined that $Ne \geq Ne_a$, then in Step S24, it is determined whether the gain G is the second gain G2. If the gain G already equals the second gain G2, a return is performed immediately, but if the gain G is still the first gain G1, then in Step S25, the gain G is switched to the second gain G2, and in Step S26, the data switching signals C1–C3 are generated to cause BGL1, BGL2, and $V_{TH}$ to be calculated according to Equations (7)–(9). A return is then performed.

The routine illustrated in FIG. 10 is repeated at predetermined intervals, such as each time the peak hold circuit 22 is reset.

In this embodiment as in the previous embodiments, since the amplifier gain G is switched among a plurality of levels according to an engine operating condition, the vibration level signal $V_p$ and the threshold signal $V_{TH}$ can be maintained within an optimal range for the comparator 44, so the accuracy of knock determination is high.

In this embodiment, the gain is switched between the first and second gains G1 and G2 whenever the rotational speed crosses a prescribed rotational speed $Ne_a$. However, it is possible to switch the gain G from the first gain G1 to the second gain G2 at a first prescribed speed $Ne_a$ and to switch the gain G from the second gain G2 back to the first gain G1 at a lower, second prescribed speed $Ne_b$ so that gain switching is carried out with hysteresis. The first and second prescribed rotational speeds $Ne_a$ and $Ne_b$ could, for example, be equal to the upper switching speed $Ne_H$ and the lower switching speed $Ne_L$, respectively of FIG. 6.

Figure 11:
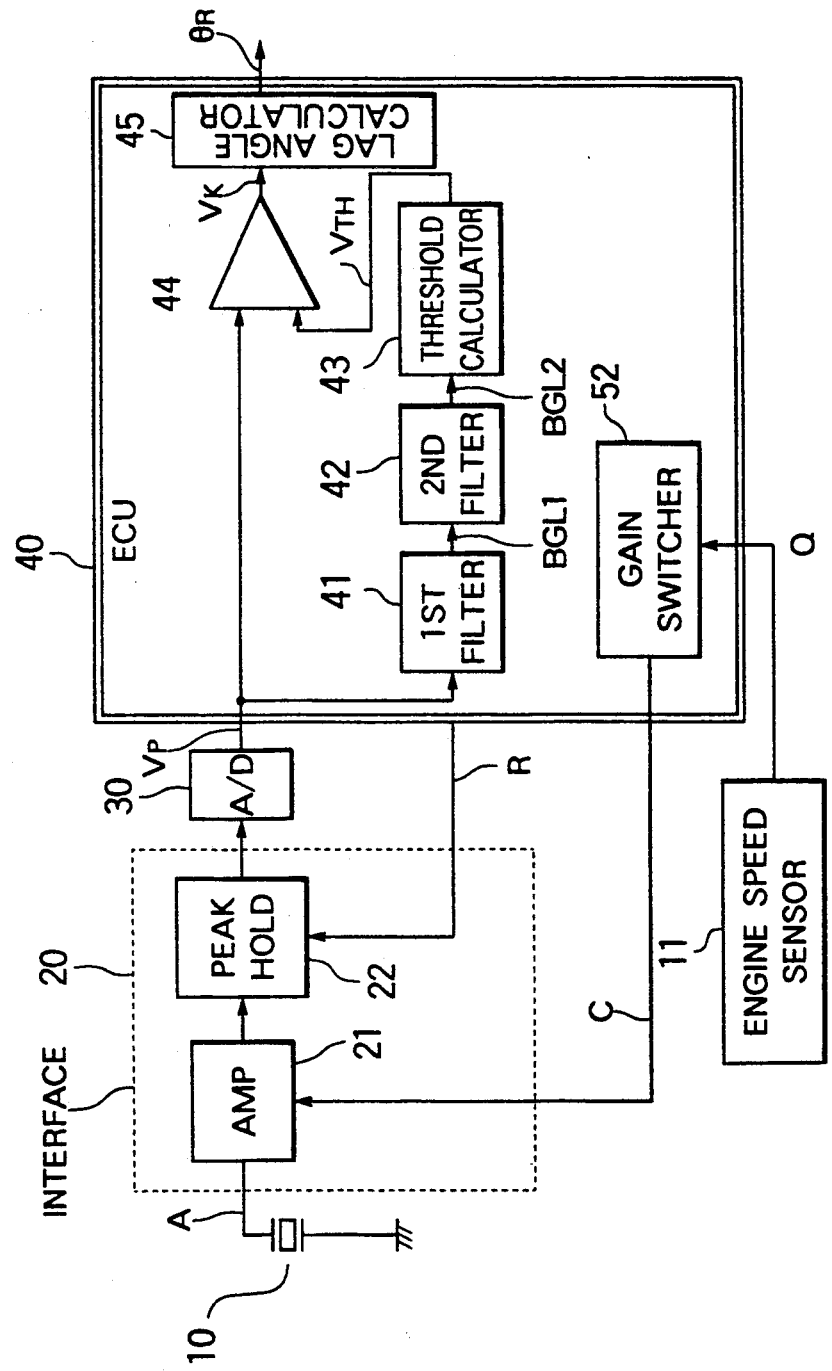
FIG. 11 is a block diagram of a fourth embodiment of the present invention.

In the preceding embodiments, the amplifier gain G is switched between two different gains G1 and G2, but the number of different gains that can be used is not limited to two. FIG. 11 illustrates another embodiment of the present invention in which the amplifier gain G is switched among three different gains, i.e., a first gain G1, a second gain G2, and a third gain G3 according to the engine operating state as indicated by the engine rotational speed Ne. The structure of this embodiment is similar to that of the embodiment of FIG. 1 except that the gain switching controller 46 of FIG. 1 is replaced by a gain switching controller 52 that receives from an engine speed sensor 11 an input signal Q indicating the engine rotational speed Ne and generates a gain switching signal C on the basis of the engine rotational speed Ne.

The engine rotational speed Ne is classified by the gain switching controller 52 into one of three regions. A first region has a first rotational speed $Ne_1$ as an upper limit. A second region is bounded by the first rotational speed $Ne_1$ and a second rotational speed $Ne_2$ which is greater than the first rotational speed $Ne_1$. A third region has the second rotational speed $Ne_2$ as a lower limit. When the engine rotational speed is in the first range, the second range, or the third range, the gain switching signal C sets the amplifier gain G to a first gain G1, a second gain G2, or a third gain G3, respectively, wherein $G1 > G2 > G3$.

Figure 12:
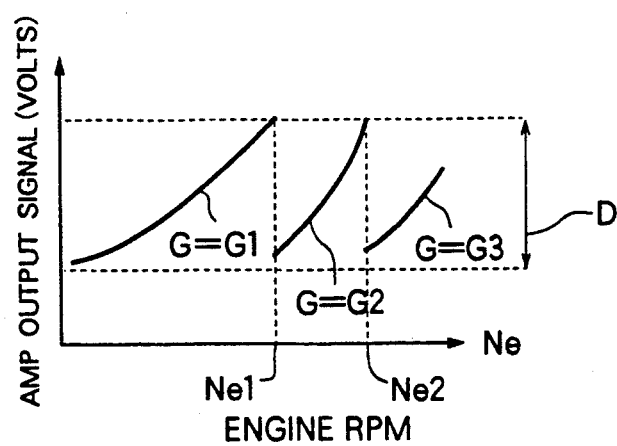
FIG. 12 is a graph showing the amplifier output signal as a function of engine rotational speed during the operation of the embodiment of FIG. 11.

FIG. 12 illustrates the level of the output signal of the amplifier 21 as a function of engine rotational speed Ne. In the figure, D indicates a suitable range for the level of the amplifier output signal. The gain G of the amplifier 21 is initially set to the first gain G1, so as the engine rotational speed Ne increases, the amplifier output signal increases along the leftmost curve marked G1. If the amplifier gain G were maintained constant, the amplifier output signal would eventually rise to outside the suitable range D with increasing rotational speed. Therefore, when the engine rotational speed Ne reaches the first rotational speed $Ne_1$, the gain switching controller 52 generates a gain switching signal C that switches the amplifier gain from the first gain G1 to the second gain G2. As a result, the amplifier output signal falls to a point along the middle curve marked G2. As the engine rotational speed increases within the second range between the first rotational speed $Ne_1$ and the second rotational speed $Ne_2$, the amplifier output signal increases along the middle curve. When the engine rotational speed Ne reaches the second rotational speed $Ne_2$, the gain switching controller 52 generates a gain switching signal C that switches the gain G from the second gain G2 down to the third gain G3. Therefore, the amplifier output signal falls to a point on the rightmost curve marked G3 and remains within the suitable range D even when the engine rotational speed increases into the third speed range. Conversely, as the engine rotational speed decreases within the third speed range and reaches the second rotational speed $Ne_2$, the gain is switched from the third gain G3 up to the second gain G2, and when the rotational speed decreases to the first rotational speed $Ne_1$, the gain is switched from the second gain G2 up to the first gain G1. The gains G1 and G2 and the first and second rotational speeds $Ne_1$ and $Ne_2$ are chosen so that at the ends of each of the three speed ranges, the amplifier output signal will remain within the suitable range D.

The number of speed ranges into which the engine speed is divided is not limited to three, and there may be four or more regions, each having a corresponding gain. The larger the number of speed ranges and gains, the more it is possible to reduce the range D within which the amplifier output signal varies, thereby decreasing the dynamic range of the threshold signal $V_{TH}$ and the vibration level signal $V_p$ and increasing the accuracy of knock determination.

As shown in FIG. 12, in the present embodiment, the speed ranges do not overlap, so switching of the gain G between two values (such as between G1 and G2) takes place at the same engine rotational speed regardless of whether the engine rotational speed is increasing or decreasing. However, it is possible to make the speed ranges overlap so as to produce hysteresis. For example, when the engine rotational speed is increasing, the gain G could be switched from the first gain G1 to the second gain G2 at the first rotational speed $Ne_1$, and when the engine rotational speed is decreasing, the gain G could be switched from the second gain G2 back to the first gain G1 at a different rotational speed $Ne_1'$ which is smaller than the first rotational speed $Ne_1$.

In this embodiment as in the previous embodiments, the peak hold circuit 22 calculates the peak value of the amplifier output signal over a prescribed period, and the A/D converter 30 digitalizes the output signal of the peak hold circuit 22 to generate a vibration level signal $V_p$. The first digital filter 41, the second digital filter 42, and the threshold calculator 40 then calculate a first average BGL1, a second average BGL2, and a threshold signal $V_{TH}$ based on the vibration level signal $V_p$ using Equations (1)-(3), respectively, and the comparator 44 compares the vibration level signal $V_p$ and the threshold signal $V_{TH}$ to generate a knock determination signal Vk, on the basis of which the lag angle calculator 45 generates a lag angle $\Theta_R$ using Equations (4) and (5). An unillustrated control unit then controls the ignition timing based on the lag angle $\Theta_R$ so as to suppress knocking.

As in the previous embodiments, the switching of the amplifier gain G among a plurality of levels according to engine operating conditions reduces the dynamic range of the input signals to the comparator 44, so accurate knock sensing can be performed over the entire speed range of the vehicle.

Figure 13:
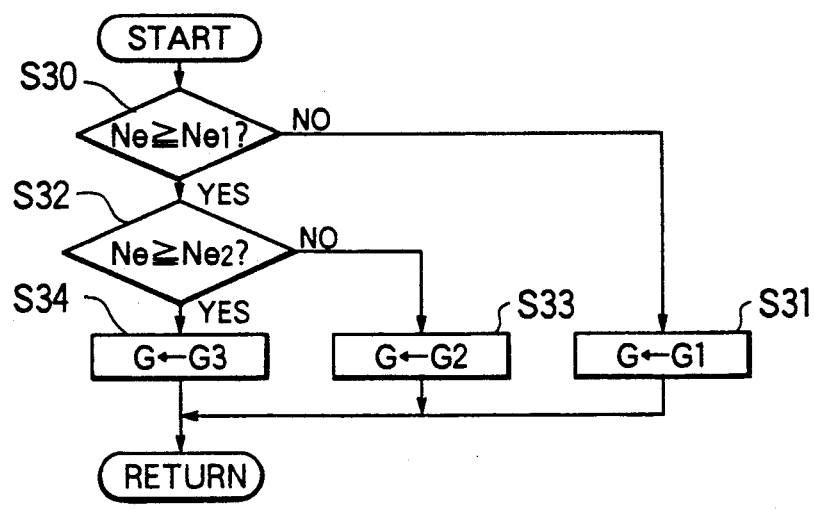
FIG. 13 is a flow chart of the operation of the embodiment of FIG. 11.

FIG. 13 is a flow chart illustrating a routine for selecting the amplifier gain that can be performed by the embodiment of FIG. 11. In Step S30, it is determined whether the engine rotational speed Ne is at least the first rotational speed $Ne_1$. If it is not, then it is determined that the engine is operating in the first speed range, so in Step S31, the gain G is set to the first gain G1 and a return is performed. If in Step S30 it is determined that the rotational speed Ne is at least the first rotational speed, then in Step S32 it is determined whether the rotational speed Ne is at least the second rotational speed $Ne_2$. If it is not, then it is determined that the engine is operating in the second speed range, so in Step S33 the gain G is set to the second gain G2 and a return is performed. If in Step S32 the rotational speed Ne is at least the second rotational speed $Ne_2$, then it is determined that the engine is operating in the third speed range, so in Step S34, the gain G is set to the third gain G3, and a return is performed.

The routine illustrated in FIG. 13 is repeated at prescribed intervals, such as each time the peak hold circuit 22 is reset.

It is possible to combine features of the embodiment of FIG. 8 with features of the embodiment of FIG. 11 to obtain a knock control apparatus in which the gain G of the amplifier 21 is switched among at least three different gains, as in the embodiment of FIG. 11, and the gain switching controller generates data switching signals C1-C3 that control the first digital filter, the second digital filter, and the threshold calculator, as in the embodiment of FIG. 8.

In the embodiments of FIGS. 5, 8, and 11, the amplifier gain is switched on the basis of an engine operating condition in the form of the engine rotational speed. However, it is possible to employ a different operating condition, such as the engine load.

Furthermore, although the preceding embodiments suppress knocking by controlling the ignition timing, it is possible to control a different operating parameter of the engine in a manner so as to suppress knocking.

Although the ECU 40 is illustrated as comprising separate components, it may instead comprise a microcomputer that performs the functions of some or all of the illustrated components.

What is claimed is:

1. A knock suppressing apparatus for an internal combustion engine comprising:
   a knock sensor for generating a knock signal indicative of engine virbrations;
   a variable gain amplifier connected to the knock sensor for amplifying the knock signal and generating an output signal;
   means for generating a vibration level signal indicative of the level of the amplifier output signal;
   means for generating a threshold signal indicative of the level of the vibration level signal;
   a comparator for comparing the vibration level signal and the threshold signal;
   engine control means responsive to the comparator for controlling an engine operating parameter so as to suppress knocking based on the result of comparison by the comparator; and
   gain control means for varying the gain of the amplifier based on the threshold signal,
   wherein the gain control means comprises means for changing the gain in a step-wise manner between at least two different levels, with hysteresis.

2. An apparatus as claimed in claim 1 wherein the gain control means comprises means for maintaining the threshold signal within a prescribed range.

3. An apparatus as claimed in claim 1 wherein the gain control means comprises means for decreasing the gain when the threshold signal becomes greater than or equal to an upper limit.

4. An apparatus as claimed in claim 1 wherein the gain control means comprises means for increasing the gain when the threshold signal becomes less than or equal to a lower limit.

5. An apparatus as claimed in claim 1 wherein the gain control means comprises means for controlling the ignition timing of the engine.

6. An apparatus as claimed in claim 1 wherein the means for generating a vibration level comprises a peak hold circuit connected in series with the amplifier.

7. A knock suppressing method for an internal combustion engine comprising:
   generating a knock signal indicative of engine vibrations;
   amplifying the knock signal with an amplification gain;
   generating a vibration level signal indicative of the level of the amplified knock signal over a first period;
   generating a threshold indicative of the level of the vibration level signal over a second period;

comparing the vibration level signal with the threshold signal;

controlling an engine operating parameter based on the result of comparison so as to suppress knocking; and controlling the amplification gain based on the level of the threshold signal, wherein controlling the gain comprises:

decreasing the gain when the threshold becomes greater than or equal to an upper limit;

measuring an upper rotational speed of the engine corresponding to the upper limit;

determining a lower rotational speed smaller than the upper rotational speed;

increasing the gain when the threshold becomes less than or equal to the lower rotational speed.

8. A method as claimed in claim 7 wherein controlling the amplification gain comprises varying the amplification gain so as to maintain the threshold signal within a prescribed range.

9. A method as claimed in claim 7 wherein controlling the gain comprises changing the gain in a step-wise manner along at least two levels.

10. A knock suppressing apparatus for an internal combustion engine comprising:

a knock sensor for generating a knock signal indicative of engine vibrations;

a variable gain amplifier connected to the knock sensor for amplifying the knock signal and generating an output signal;

means for generating a vibration level signal indicative of the level of the amplifier output signal;

means for generating a threshold signal indicative of the level of the vibration level signal;

a comparator for comparing the vibration level signal and the threshold signal;

engine control means responsive to the comparator for controlling an engine operating parameter so as to suppress knocking based on the result of comparison by the comparator; and gain control means for varying the gain of the amplifier based on the threshold signal, further comprising a speed sensor for sensing an engine operating condition indicative of the engine rotational speed and generating a corresponding output signal, wherein the gain control means comprises:

means for decreasing the gain when the threshold signal is greater than or equal to an upper limit;

means responsive to the speed sensor for determining an upper engine rotational speed corresponding to the upper limit;

means for calculating a lower engine rotational speed smaller than the upper engine rotational speed; and means for increasing the gain when the engine rotational speed becomes less than or equal to the lower engine rotational speed.

11. A knock suppressing method for an internal combustion engine comprising:

generating a knock signal indicative of engine vibrations;

amplifying the knock signal with an amplification gain;

generating a vibration level signal indicative of the level of the amplified knock signal over a first period;

generating a threshold indicative of the level of the vibration level signal over a second period;

comparing the vibration level signal with the threshold signal;

controlling an engine operating parameter based on the result of comparison so as to suppress knocking; and controlling the amplification gain based on the level of the threshold signal in a step-wise manner between at least two different levels, with hysteresis.

12. A method as claimed in claim 11 wherein controlling the amplification gain comprises decreasing the gain when the threshold becomes greater than or equal to an upper limit.

13. A method as claimed in claim 11 wherein controlling the amplification gain comprises increasing the gain the threshold becomes less than or equal to a lower limit.

* * * * *